(12) United States Patent
Nguyen

(10) Patent No.: US 7,017,665 B2
(45) Date of Patent: Mar. 28, 2006

(54) STRENGTHENING NEAR WELL BORE SUBTERRANEAN FORMATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 156 days.

(21) Appl. No.: 10/650,063

(22) Filed: Aug. 26, 2003

(65) Prior Publication Data

US 2005/0045330 A1    Mar. 3, 2005

(51) Int. Cl.
*E21B 43/26* (2006.01)
*E21B 33/138* (2006.01)

(52) U.S. Cl. ............... 166/281; 166/295; 166/297; 166/300; 507/219; 507/220; 507/234; 507/237; 507/238; 507/266; 507/267; 523/131

(58) Field of Classification Search ............ 166/281, 166/295, 300, 297, 298; 523/131; 507/219, 507/220, 234, 237, 238, 266, 267
See application file for complete search history.

(56) References Cited

U.S. PATENT DOCUMENTS

| | | | |
|---|---|---|---|
| 2,238,671 A | | 4/1941 | Woodhouse |
| 2,703,316 A | | 3/1955 | Schneider ............... 260/78.3 |
| 2,869,642 A | | 1/1959 | McKay et al. |
| 3,047,067 A | * | 7/1962 | Williams et al. ............ 166/295 |
| 3,123,138 A | | 3/1964 | Robichaux |
| 3,176,768 A | * | 4/1965 | Brandt et al. ............... 166/295 |
| 3,199,590 A | | 8/1965 | Young |
| 3,272,650 A | | 9/1966 | MacVittie ................. 134/7 |
| 3,297,086 A | | 1/1967 | Spain |
| 3,308,885 A | | 3/1967 | Sandiford |
| 3,316,965 A | | 5/1967 | Watanabe |
| 3,375,872 A | | 4/1968 | McLaughlin et al. |
| 3,404,735 A | | 10/1968 | Young et al. ............... 166/33 |
| 3,415,320 A | | 12/1968 | Young |
| 3,492,147 A | | 1/1970 | Young et al. ............. 117/62.2 |
| 3,659,651 A | | 5/1972 | Graham .................. 166/280 |
| 3,681,287 A | | 8/1972 | Brown et al. ............... 260/67 |
| 3,754,598 A | | 8/1973 | Holloway, Jr. ............. 166/249 |
| 3,765,804 A | | 10/1973 | Brandon .................. 417/540 |
| 3,768,564 A | | 10/1973 | Knox et al. ............... 166/307 |
| 3,784,585 A | | 1/1974 | Schmitt et al. ............ 260/861 |

(Continued)

FOREIGN PATENT DOCUMENTS

CA    2063877    5/2003

(Continued)

OTHER PUBLICATIONS

Halliburton Cobra Frac Advertisement, 2001.

(Continued)

*Primary Examiner*—George Suchfield
(74) *Attorney, Agent, or Firm*—Robert A. Kent; Baker Botts

(57) ABSTRACT

The present invention relates to improved methods for completing well bores along producing zones and, more particularly, to methods for strengthening near well bore subterranean formations. Some embodiments of the present invention provide a method of strengthening the near well bore region of a subterranean formation comprising the steps of isolating a zone of interest along a well bore; either hydrajetting a slot in the zone of interest or acidizing the zone of interest to create wormholes; filling the slot or wormholes with a consolidation material wherein the viscosity of the consolidation material is sufficient to enable the consolidation material to penetrate a distance into the formation; and, allowing the consolidation material to substantially cure.

14 Claims, 1 Drawing Sheet

U.S. PATENT DOCUMENTS

| | | | |
|---|---|---|---|
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A * | 12/1974 | Copeland | 166/276 |
| 3,863,709 A | 2/1975 | Fitch | 165/1 |
| 6,868,998 B1 | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnsberger | 106/90 |
| 3,955,993 A | 5/1976 | Curtice et al. | 106/90 |
| 3,960,736 A | 6/1976 | Free et al. | |
| 4,008,763 A | 2/1977 | Lowe et al. | 166/253 |
| 4,029,148 A | 6/1977 | Emery | 166/250.1 |
| 4,031,958 A | 6/1977 | Sandiford et al. | 166/270 |
| 4,042,032 A * | 8/1977 | Anderson et al. | 166/276 |
| 4,070,865 A | 1/1978 | McLaughlin | |
| 4,074,760 A | 2/1978 | Copeland et al. | 166/276 |
| 4,169,798 A | 10/1979 | DeMartino | |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | |
| 4,460,052 A | 7/1984 | Gockel | 175/72 |
| 4,470,915 A | 9/1984 | Conway | |
| 4,493,875 A | 1/1985 | Beck et al. | 428/403 |
| 4,494,605 A | 1/1985 | Wiechel et al. | 166/288 |
| 4,498,995 A | 2/1985 | Gockel | |
| 4,501,328 A | 2/1985 | Nichols | 166/288 |
| 4,526,695 A | 7/1985 | Erbstoesser et al. | |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/293 |
| 4,829,100 A | 5/1989 | Murphey et al. | 523/131 |
| 4,838,352 A | 6/1989 | Oberste-Padtberg et al. | 166/291 |
| 4,842,072 A * | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,494,103 A | 2/1996 | Surjaatmadja et al. | 166/222 |
| 5,494,178 A | 2/1996 | Maharg | 166/276 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |

| Patent No. | Date | Inventor | Class |
|---|---|---|---|
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A * | 8/1996 | McDaniel et al. | 166/280.1 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/269 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,697,440 A | 12/1997 | Weaver et al. | 166/281 |
| 5,698,322 A | 12/1997 | Tsai et al. | 428/373 |
| 5,712,314 A * | 1/1998 | Surles et al. | 166/295 |
| 5,732,364 A | 3/1998 | Kalb et al. | 588/8 |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/276 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacob et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,152,234 A | 11/2000 | Newhouse et al. | 166/403 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | 166/276 |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/271 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |
| 6,330,917 B1 | 12/2001 | Chatterji et al. | 166/295 |
| 6,350,309 B1 | 2/2002 | Chatterji et al. | 106/677 |
| 6,357,527 B1 | 3/2002 | Norman et al. | 166/300 |
| 6,364,018 B1 | 4/2002 | Brannon et al. | 166/280.2 |
| 6,364,945 B1 | 4/2002 | Chatterji et al. | 106/677 |
| 6,367,165 B1 | 4/2002 | Huttlin | 34/582 |

| | | | |
|---|---|---|---|
| 6,367,549 B1 | 4/2002 | Chatterji et al. ............. 166/292 |
| 6,372,678 B1 | 4/2002 | Youngsman et al. ......... 504/128 |
| 6,376,571 B1 | 4/2002 | Chawla et al. ................. 522/64 |
| 6,387,986 B1 | 5/2002 | Moradi-Araghi et al. ... 523/211 |
| 6,390,195 B1 | 5/2002 | Nguyen et al. .............. 166/276 |
| 6,401,817 B1 | 6/2002 | Griffith et al. ............... 166/295 |
| 6,405,797 B1 | 6/2002 | Davidson et al. ............ 166/249 |
| 6,406,789 B1 | 6/2002 | McDaniel et al. ........... 428/403 |
| 6,408,943 B1 | 6/2002 | Schultz et al. ............... 166/285 |
| 6,422,314 B1 | 7/2002 | Todd et al. ................... 166/312 |
| 6,439,309 B1 | 8/2002 | Matherly et al. ............. 166/276 |
| 6,439,310 B1 | 8/2002 | Scott, III et al. ............ 166/308 |
| 6,440,255 B1 | 8/2002 | Kohlhammer et al. ....... 156/283 |
| 6,446,727 B1 | 9/2002 | Zemlak et al. ............... 166/308 |
| 6,448,206 B1 | 9/2002 | Griffith et al. ............... 507/219 |
| 6,450,260 B1 | 9/2002 | James et al. ................. 166/277 |
| 6,454,003 B1 | 9/2002 | Chang et al. ................ 166/270 |
| 6,458,885 B1 | 10/2002 | Stengal et al. ............... 524/507 |
| 6,485,947 B1 | 11/2002 | Rajgarhia et al. ............ 435/139 |
| 6,488,091 B1 | 12/2002 | Weaver et al. ............... 166/300 |
| 6,488,763 B1 | 12/2002 | Brothers et al. ............. 106/692 |
| 6,494,263 B1 | 12/2002 | Todd ............................ 166/312 |
| 6,503,870 B1 | 1/2003 | Griffith et al. ............... 507/219 |
| 6,508,305 B1 | 1/2003 | Brannon et al. ............. 166/293 |
| 6,527,051 B1 | 3/2003 | Reddy et al. ................. 166/300 |
| 6,528,157 B1 | 3/2003 | Hussain et al. .............. 428/325 |
| 6,531,427 B1 | 3/2003 | Shuchart et al. ............. 507/267 |
| 6,538,576 B1 | 3/2003 | Schultz et al. ............ 340/859.6 |
| 6,543,545 B1 | 4/2003 | Chatterji et al. ............. 166/381 |
| 6,552,333 B1 | 4/2003 | Storm et al. ............... 250/269.3 |
| 6,554,071 B1 | 4/2003 | Reddy et al. ................. 166/293 |
| 6,555,507 B1 | 4/2003 | Chatterji et al. ............. 507/219 |
| 6,569,814 B1 | 5/2003 | Brady et al. ................. 507/201 |
| 6,582,819 B1 | 6/2003 | McDaniel et al. ........... 428/402 |
| 6,593,402 B1 | 7/2003 | Chatterji et al. ................ 524/7 |
| 6,599,863 B1 | 7/2003 | Palmer et al. ................ 507/219 |
| 6,608,162 B1 | 8/2003 | Chiu et al. .................... 528/129 |
| 6,616,320 B1 | 9/2003 | Huber et al. ............... 366/156.2 |
| 6,620,857 B1 | 9/2003 | Valet ............................. 522/42 |
| 6,626,241 B1 | 9/2003 | Nguyen ........................ 166/278 |
| 6,632,527 B1 | 10/2003 | McDaniel et al. ........... 428/402 |
| 6,632,892 B1 | 10/2003 | Rubinsztajn et al. ........ 525/476 |
| 6,642,309 B1 | 11/2003 | Komitsu et al. .............. 525/100 |
| 6,648,901 B1 | 11/2003 | Huber et al. ................. 366/301 |
| 6,659,179 B1 | 12/2003 | Nguyen ........................ 166/227 |
| 6,664,343 B1 | 12/2003 | Narisawa et al. ............ 525/474 |
| 6,667,279 B1 | 12/2003 | Hessert et al. ............... 507/225 |
| 6,668,926 B1 | 12/2003 | Nguyen et al. ............... 166/280 |
| 6,669,771 B1 | 12/2003 | Tokiwa et al. ............. 106/162.7 |
| 6,681,856 B1 | 1/2004 | Chatterji et al. ............. 166/294 |
| 6,686,328 B1 | 2/2004 | Binder .......................... 510/446 |
| 6,705,400 B1 | 3/2004 | Nguyen et al. ............... 166/281 |
| 6,710,019 B1 | 3/2004 | Sawdon et al. .............. 507/136 |
| 6,713,170 B1 | 3/2004 | Kaneko et al. ............... 428/323 |
| 6,725,926 B1 | 4/2004 | Nguyen et al. ............ 166/254.1 |
| 6,725,931 B1 | 4/2004 | Nguyen et al. ............ 166/280.2 |
| 6,729,404 B1 | 5/2004 | Nguyen et al. ............ 166/280.2 |
| 6,732,800 B1* | 5/2004 | Acock et al. ................. 166/295 |
| 6,745,159 B1 | 6/2004 | Todd et al. .................... 703/10 |
| 6,749,025 B1 | 6/2004 | Brannon et al. .......... 166/305.1 |
| 6,763,888 B1 | 7/2004 | Harris et al. ............... 166/305.1 |
| 6,766,858 B1 | 7/2004 | Nguyen et al. ............... 166/300 |
| 6,776,236 B1* | 8/2004 | Nguyen ........................ 166/279 |
| 6,832,650 B1 | 12/2004 | Nguyen et al. ............... 166/279 |
| 6,851,474 B1 | 2/2005 | Nguyen ........................ 166/279 |
| 6,887,834 B1 | 5/2005 | Nguyen et al. ............... 507/221 |
| 2001/0016562 A1 | 8/2001 | Muir et al. ................... 507/201 |
| 2002/0043370 A1 | 4/2002 | Poe ........................ 166/250.07 |
| 2002/0048676 A1 | 4/2002 | McDaniel et al. ........... 428/404 |
| 2002/0070020 A1* | 6/2002 | Nguyen ........................ 166/295 |
| 2003/0006036 A1 | 1/2003 | Malone et al. .......... 166/250.12 |
| 2003/0060374 A1 | 3/2003 | Cooke, Jr. .................... 507/200 |
| 2003/0114314 A1 | 6/2003 | Ballard et al. ............... 507/100 |
| 2003/0130133 A1 | 7/2003 | Vollmer ....................... 507/100 |
| 2003/0131999 A1 | 7/2003 | Nguyen et al. .............. 166/280 |
| 2003/0148893 A1 | 8/2003 | Lungofer et al. ............ 507/200 |
| 2003/0186820 A1 | 10/2003 | Thesing ....................... 507/200 |
| 2003/0188766 A1 | 10/2003 | Banerjee et al. ................ 134/7 |
| 2003/0188872 A1 | 10/2003 | Nguyen et al. .............. 166/308 |
| 2003/0196805 A1 | 10/2003 | Boney et al. ................ 166/280 |
| 2003/0205376 A1 | 11/2003 | Ayoub et al. ............. 166/254.2 |
| 2003/0230408 A1 | 12/2003 | Acock et al. ................ 166/297 |
| 2003/0234103 A1 | 12/2003 | Lee et al. .................... 166/293 |
| 2004/0000402 A1 | 1/2004 | Nguyen et al. .............. 166/280 |
| 2004/0014607 A1 | 1/2004 | Sinclair et al. .............. 507/200 |
| 2004/0014608 A1 | 1/2004 | Nguyen et al. .............. 507/200 |
| 2004/0040706 A1 | 3/2004 | Hossaini et al. ............. 166/278 |
| 2004/0040708 A1 | 3/2004 | Stephenson et al. ...... 166/280.1 |
| 2004/0040713 A1 | 3/2004 | Nguyen et al. .............. 166/295 |
| 2004/0048752 A1 | 3/2004 | Nguyen et al. .............. 507/269 |
| 2004/0055747 A1 | 3/2004 | Lee ............................. 166/278 |
| 2004/0106525 A1 | 6/2004 | Willbert et al. ............. 507/200 |
| 2004/0138068 A1 | 7/2004 | Rimmer et al. ............. 507/100 |
| 2004/0149441 A1 | 8/2004 | Nguyen et al. ........... 166/280.1 |
| 2004/0152601 A1 | 8/2004 | Still et al. .................... 507/100 |
| 2004/0177961 A1 | 9/2004 | Nguyen et al. ........... 166/280.2 |
| 2004/0194961 A1 | 10/2004 | Nguyen et al. .............. 166/295 |
| 2004/0206499 A1 | 10/2004 | Nguyen et al. ........... 166/280.2 |
| 2004/0211559 A1 | 10/2004 | Nguyen et al. .............. 166/276 |
| 2004/0211561 A1 | 10/2004 | Nguyen et al. ........... 166/280.2 |
| 2004/0221992 A1 | 11/2004 | Nguyen et al. .............. 166/295 |
| 2004/0231845 A1 | 11/2004 | Cooke, Jr. .................... 166/279 |
| 2004/0231847 A1 | 11/2004 | Nguyen et al. .............. 166/295 |
| 2004/0256099 A1 | 12/2004 | Nguyen et al. .............. 166/249 |
| 2004/0261995 A1 | 12/2004 | Nguyen et al. .............. 166/279 |
| 2004/0261997 A1 | 12/2004 | Nguyen et al. .............. 166/281 |
| 2005/0000731 A1 | 1/2005 | Nguyen et al. ................ 175/57 |
| 2005/0006093 A1 | 1/2005 | Nguyen et al. .............. 166/281 |
| 2005/0006096 A1 | 1/2005 | Nguyen et al. .............. 166/295 |
| 2005/0045326 A1* | 3/2005 | Nguyen ........................ 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0933498 A1 | 8/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |
| EP | 1464789 A1 | 10/2004 |
| GB | 1292718 | 10/1972 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |

WO  WO 05/021928 A2  3/2005

OTHER PUBLICATIONS

Halliburton Technical Flier—Multi Stage Frac Completion Methods.
SPE 60747, "Optimizing and Managing Coiled Tubing Frac Strings," Serguei Kazakov and Keith Rispler, 2000.
S. W. Almond, et al., "Factors Affecting Proppant Flowback with Resin Coated Proppants," Society of Petroleum Engineers, Inc., SPE 30096, p. 171-186, 1995.
U.S. Appl. No. 10/383,154, Mar. 6, 2003, Nguyen et al.
U.S. Appl. No. 10/394,898, Mar. 21, 2003, Eoff et al.
U.S. Appl. No. 10/408,800, Apr. 7, 2003, Nguyen et al.
U.S. Appl. No. 10/601,407, Jun. 23, 2003, Byrd et al.
U.S. Appl. No. 10/603,492, Jun. 25, 2003, Nguyen et al.
U.S. Appl. No. 10/649,029, Aug. 27, 2003, Nguyen et al.
U.S. Appl. No. 10/650,063, Aug. 26, 2003, Nguyen.
U.S. Appl. No. 10/650,064, Aug. 26, 2003, Nguyen et al.
U.S. Appl. No. 10/650,065, Aug. 26, 2003, Nguyen.
U.S. Appl. No. 10/659,574, Sep. 10, 2003, Nguyen et al.
U.S. Appl. No. 10/727,365, Dec. 4, 2003, Reddy et al.
U.S. Appl. No. 10/751,593, Jun. 5, 2004, Nguyen.
U.S. Appl. No. 10/775,347, Feb. 10, 2004, Nguyen.
U.S. Appl. No. 10/791,944, Mar. 3, 2004, Nguyen.
U.S. Appl. No. 10/793,711, Mar. 5, 2004, Nguyen et al.
U.S. Appl. No. 10/852,811, May 25, 2004, Nguyen.
U.S. Appl. No. 10/853,879, May 26, 2004, Nguyen et al.
U.S. Appl. No. 10/860,951, Jun. 4, 2004, Stegent et al.
U.S. Appl. No. 10/861,829, Jun. 4, 2004, Stegent et al.
U.S. Appl. No. 10/862,986, Jun. 8, 2004, Nguyen et al.
U.S. Appl. No. 10/864,061, Jun. 9, 2004, Blauch et al.
U.S. Appl. No. 10/864,618, Jun. 9, 2004, Blauch et al.
U.S. Appl. No. 10/868,593, Jun. 15, 2004, Nguyen et al.
U.S. Appl. No. 10/868,608, Jun. 15, 2004, Nguyen et al.
U.S. Appl. No. 10/937,076, Sep. 9, 2004, Nguyen et al.
U.S. Appl. No. 10/944,973, Sep. 20, 2004, Nguyen et al.
U.S. Appl. No. 10/972,648, Oct. 25, 2004, Dusterhoft et al.
U.S. Appl. No. 10/977,673, Oct. 29, 2004, Nguyen.
U.S. Appl. No. 11/009,277, Dec. 8, 2004, Welton et al.
U.S. Appl. No. 11/011,394, Dec. 12, 2004, Nguyen et al.
U.S. Appl. No. 11/035,833, Jan. 14, 2005, Nguyen.
U.S. Appl. No. 11/049,252, Feb. 2, 2005, Van Batenburg et al.
U.S. Appl. No. 11/053,280, Feb. 8, 2005, Nguyen.
U.S. Appl. No. 11/056,635, Feb. 11, 2005, Dusterhoft et al.
Halliburton, *CoalStim*[SM] *Service, Helps Boost Cash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburtion Commmunications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton "*CobraFrac*[SM] *Service, Coiled Tubing Fracturing—Cost-Effective Method for Stimulating Untapped Reserves*", 2 pages.
Halliburton "*CobraJetFrac*[SM] *Service, Cost-Effective Technology That Can Help Reduce Cost per BOE Produced, Shorten Cycle time and Reduce Capex*".

Halliburton "*SurgiFrac*[SM] *Service, a Quick and cost-Effective Method to Help Boost Production From Openhole Horizonal Completions*".
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al, 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., "*New Guidelines For Applying Curable Resin-Coated Proppants*", SPE Paper No. 39582, 1997.
Advances in Polymer Science, vol. 157, "*Degradable Aliphatic Polyesters*", edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", American Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al.,"*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.

CDX Gas, CDX Solution, 2003, CDX, LLC, Available @ www.cdxgas.com/solution.html, printed pp 1-2.

CDX Gas, *What is Coalbed Methane?* CDX, LLC. Available @ www.cdxgas.com/what.html, printed p. 1.

Halliburton brochure entitled "H2Zero™ Service Introducing The Next Generation of cost-Effective Conformance Control Solutions", 2002.

Halliburton brochure entitled INJECTROL® A Component, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

\* cited by examiner

STRENGTHENING NEAR WELL BORE SUBTERRANEAN FORMATIONS

FIELD OF THE INVENTION

The present invention relates to improved methods for completing well bores along producing zones and, more particularly, to methods for strengthening near well bore subterranean formations.

DESCRIPTION OF THE PRIOR ART

In many well bores penetrating relatively weak subterranean formations, a casing is cemented in place in the well bore and then perforated to establish communication between the well bore and the subterranean formation. The formation of perforations in the casing generally establishes communication through the casing and surrounding cement into the adjacent subterranean formation. Once such communication established, it is often desirable to fracture the subterranean formation in contact with the perforations to facilitate the flow of desirable hydrocarbons or other fluids present in the formation to the well bore. Various methods and apparatus have been used to effect perforation and fracturing of a subterranean formation. Perforations have been produced mechanically such as by hydrojetting, by jet perforating, and through the use of explosive charges.

Hydrajetting, involves the use of hydraulic jets, inter alia, to increase the permeability and production capabilities of a formation. In a common hydrajetting operation, a hydrajetting tool having at least one fluid jet forming nozzle is positioned adjacent to a formation to be fractured, and fluid is then jetted through the nozzle against the formation at a pressure sufficient to form a cavity, known as a "slot." The slot may then be propagated into a further fracture by applying stagnation pressure to the slot. Because the jetted fluids would have to flow out of the slot in a direction generally opposite to the direction of the incoming jetted fluid they are trapped in the slot and create a relatively high stagnation pressure at the tip of a cavity. This high stagnation pressure often causes a microfracture to be formed that extends a short distance into the formation. Pumping a fluid into the well bore to raise the ambient fluid pressure exerted on the formation may further extend the microfracture while the formation is being hydrajetted. Such a fluid in the well bore will flow into the slot and fracture produced by the fluid jet and, if introduced into the well bore at a sufficient rate and pressure, may be used to extend the microfracture an additional distance from the well bore into the formation.

Fracturing has been accomplished by introducing an aqueous or hydrocarbon liquid into the formation through the perforations at a rate and pressure sufficient to fracture the subterranean formation. In some instances, the fracturing fluid may include a propping agent to prop the created fracture open upon completion of the fracturing treatment. The propped fracture provides an open channel through which fluids may pass from the formation to the well bore.

However, weak subterranean formations, such as coal seams, sandstones, shales and chalk formations, are often too unstable to accept traditional stimulation treatments such a fracturing. Often, the primary point of weakness that makes such treatments unsuccessful is the near well bore area of such a subterranean formation.

SUMMARY OF THE INVENTION

The present invention relates to improved methods for completing well bores along producing zones and, more particularly, to methods for strengthening near well bore subterranean formations.

Some embodiments of the present invention provide a method of strengthening the near well bore region of a subterranean formation comprising the steps of isolating a zone of interest along a well bore; hydrajetting at least one slot in the zone of interest; filling the slot with a consolidation material wherein the viscosity of the consolidation material is sufficient to enable the consolidation material to penetrate a distance into the formation; and, allowing the consolidation material to substantially cure.

Other embodiments of the present invention provide a method of strengthening the near well bore region of a subterranean formation comprising the steps of isolating a zone of interest along a well bore; acidizing the zone of interest with an acid to create a plurality of wormholes; filling the wormholes with a consolidation material wherein the viscosity of the consolidation material is sufficient to enable the consolidation material to penetrate a distance into the formation; and, allowing the consolidation material to substantially cure.

Other and further objects, features and advantages of the present invention will be readily apparent to those skilled in the art upon a reading of the description of preferred embodiments which follows.

BRIEF DESCRIPTION OF THE FIGURES

These figures illustrate certain aspects of some of the embodiments of the present invention, and should not be used to limit or define the invention.

DESCRIPTION OF PREFERRED EMBODIMENTS

Figure 1:
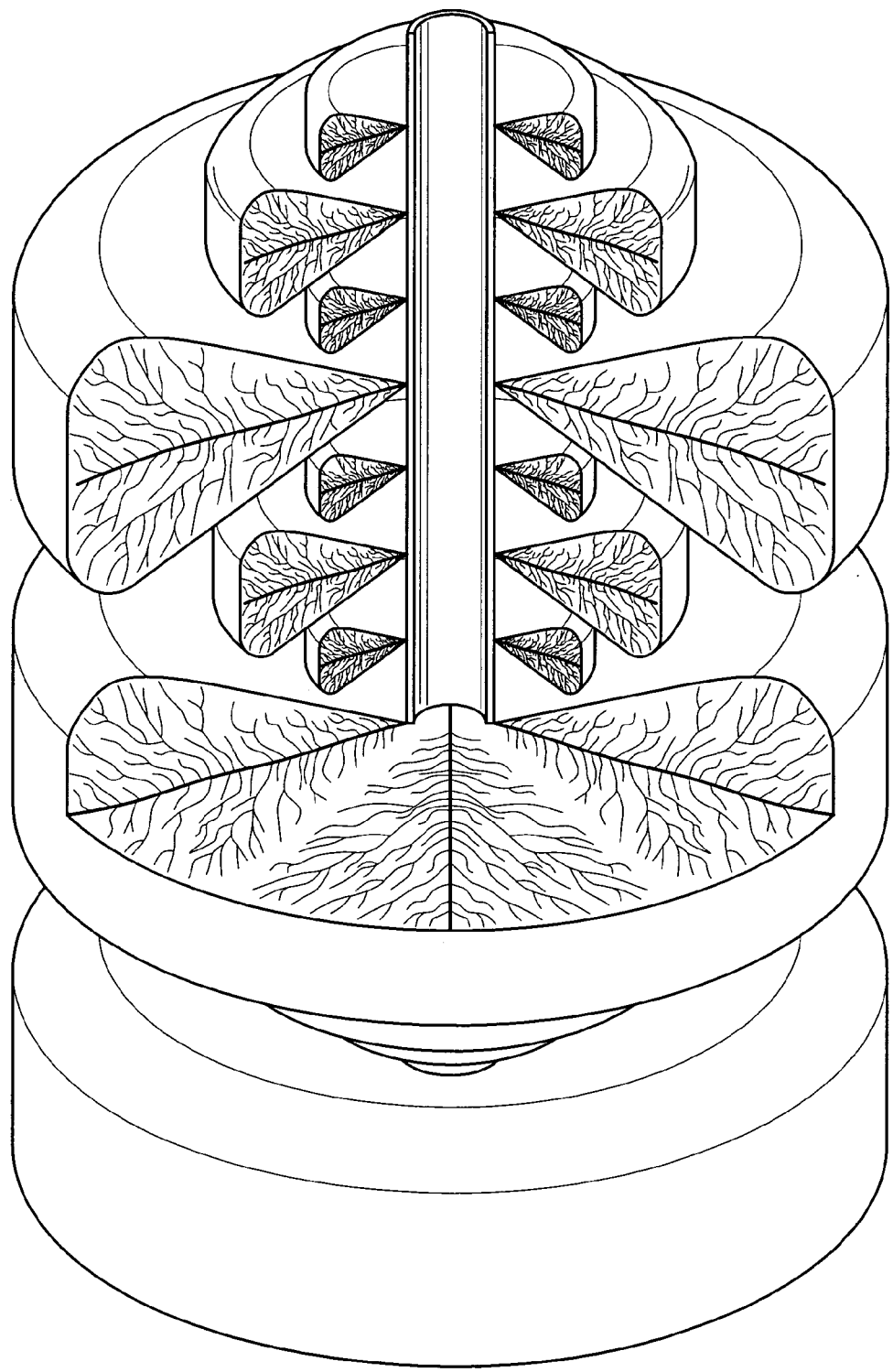
FIG. 1 illustrates a portion of a subterranean formation treated using an embodiment of the present invention.

The present invention relates to improved methods for completing well bores along producing zones and, more particularly, to methods for strengthening near well bore subterranean formations.

Some subterranean formations, such as coal seams, sandstones, shales and chalk formations, are not only too weak to accept stimulation treatments, they also exhibit very low permeabilities, sometimes less than about 5 md. In those formations, the consolidating material may not be able to permeate far enough into the subterranean formation near the well bore to offer a sufficient increase in strength such that the subterranean formation can withstand a stimulation treatment. Thus, in some embodiments of the present invention, the near well bore subterranean formation may be subjected to an extending treatment wherein the formation is treated to increase the distance a later placed material, such as a consolidating material, can penetrate the near well bore subterranean formation.

In some embodiments of the methods of the present invention, a zone of interest along a well bore is isolated and the isolated zone is treated to increase the distance in which a later-placed material can penetrate the near well bore subterranean formation, and then a consolidating material is introduced into the slot. The consolidation material acts, inter alia, to increase the strength of the near well bore formation such that a traditional stimulation treatment such as fracturing can be performed. By first treating the zone to increase the distance the consolidating material can penetrate into the near well bore formation, the consolidating material is able to consolidate a deeper annulus into the formation from the walls of the well bore.

In other embodiments of the present invention, the extending treatment may be a hydrajetting procedure. Hydrajetting basically involves the use of a tool such as those described in U.S. Pat. Nos. 5,765,642, 5,494,103, and 5,361,856, the relevant portions of which are herein incorporated by reference, to create a path, known as a "slot," into the formation from the well bore. The term "slot" should not be read to imply any particular shape of a path. A slot created by a hydrajetting tool creates a path a later placed consolidation material may take to proceed further into the near well bore subterranean formation then it would have been able to proceed if it were forced to penetrate the formation via permeation alone. In some embodiments of the present invention, the hydrajetting tool is used to create slots substantially uniformly around the well bore circumference such that when the consolidation fluid is introduced to the near well bore area it is able to substantially uniformly penetrate and consolidate an annulus around the well bore into the formation.

In other embodiments of the present invention, the extending treatment is an acidizing procedure. In an acidizing procedure, the near well bore subterranean formation is treated with an acid to create a plurality of tunnels known as "wormholes." Once a wormhole pattern is established, a later placed material, such as a consolidating resin, may be introduced to the near well bore area. By first establishing the wormhole pattern, the consolidation material is able to penetrate further into the near well bore subterranean formation by filling in and then permeating from the wormholes.

Any acid capable of creating wormholes in the subterranean formation may be suitable for use in the present invention. Nonlimiting examples of suitable such acids include hydrochloric acid, hydrofluoric acid, acetic acid, formic acid, citric acid, ethylene diamine tetra acetic acid ("EDTA"), and combinations thereof. When selecting an acid for use in the present invention, consideration should be given to the formation temperature, the acid-reactivity of the formation, the porosity of the formation, formation permeability, and injection rate. By way of example and not of limitation, in a formation having a relatively high acid-reactivity and a relatively high temperature, more intricate wormholes may be achieved by using a relatively weak acid such as acetic acid. More intricate wormholes may allow for a more uniform distribution of the consolidation material into the subterranean formation, thus better strengthening in the near well bore area. In addition to considering the type of acid used, the concentration of acid must also be considered. Selection of the concentration of acid to be used is related to the same considerations listed above with respect to selection of the type of acid. It is within the ability of one skilled in the art, with the benefit of this disclosure, to consider the formation at issue, the consolidation desired, and the acid chosen to select an appropriate acid concentration.

Wormholes formed via an acidizing extending process are preferably symmetrical. A 1999 Society of Petroleum Engineers Paper (paper number 54719 entitled "Fundamentally New Model of Acid Wormholing in Carbonates," the relevant disclosure of which is herein incorporated by reference) postulates that the formation of wormholes into carbonaceous material may be highly symmetrical. The paper further notes that wormhole length may be predominately controlled by the matrix porosity of the formation and the volume of acid pumped rather than by the acid's reactivity, as was taught in the prior art. Thus, while the concentration of the chosen acid must be considered, that concentration may not have a substantial effect on wormhole length. Moreover, wormhole diameter may be predominately controlled by the acid-reactivity of the formation, the contact time, the matrix porosity of the formation and the volume of acid pumped. FIG. 1 shows a highly idealized visualization of how acid may penetrate into the near well bore area to create a series of intricate and symmetrical wormholes that may act as an extending treatment of the present invention.

In some embodiments of the present invention, the consolidation material is a one-component curable resin that does not require the use of an external catalyst to cure. Suitable such resin consolidation materials include, but are not limited to, two-component epoxy-based resins, furan-based resins, phenolic-based resins, high-temperature (HT) epoxy-based resins, and phenol/phenol formaldehyde/furfuryl alcohol resins.

Selection of a suitable resin consolidation material may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

One resin consolidation material suitable for use in the methods of the present invention is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, inter alia, breaking gelled fracturing fluid films on the proppant particles, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be utilized in the liquid hardenable resin component include, but are not limited to, organic resins such as bisphenol A-epichlorohydrin resins, polyepoxide resins, novolak resins, polyester resins, phenol-aldehyde resins, urea-aldehyde resins, furan resins, urethane resins, glycidyl ethers and mixtures thereof. The resin utilized is included in the liquid hardenable resin component in an amount sufficient to consolidate particulates. In some embodiments of the present invention, the resin utilized is included in the liquid hardenable resin component in the range of from about 70% to about 100% by weight of the liquid hardenable resin component.

Any solvent that is compatible with the hardenable resin and achieves the desired viscosity effect is suitable for use in the present invention. Preferred solvents are those having high flash points (most preferably about 125° F.) because of, inter alia, environmental factors. As described above, use of a solvent in the hardenable resin composition is optional but may be desirable to reduce the viscosity of the hardenable resin component for a variety of reasons including ease of handling, mixing, and transferring. It is within the ability of one skilled in the art with the benefit of this disclosure to determine if and how much solvent is needed to achieve a suitable viscosity. Solvents suitable for use in the present invention include, but are not limited to, butylglycidyl ethers, dipropylene glycol methyl ethers, dipropylene glycol dimethyl ethers, dimethyl formamides, diethyleneglycol methyl ethers, ethyleneglycol butyl ethers, diethyleneglycol butyl ethers, propylene carbonates, methanols, butyl alcohols, d'limonene and fatty acid methyl esters.

Examples of the hardening agents that can be utilized in the liquid hardening agent component of the two-component consolidation fluids of the present invention include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent depends, in part, on the temperature of the formation in which the hardening agent will be used. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. The hardening agent utilized is included in the liquid hardening agent component in an amount sufficient to consolidate particulates. In some embodiments of the present invention, the hardening agent used is included in the liquid hardenable resin component in the range of from about 40% to about 60% by weight of the liquid hardening agent component.

The silane coupling agent may be used, inter alia, to act as a mediator to help bond the resin to the surfaces of formation particulates. Examples of silane coupling agents that can be used in the liquid hardening agent component of the two-component consolidation fluids of the present invention include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the liquid hardening agent may be used in the present invention. Such surfactants include, but are not limited to, ethoxylated nonyl phenol phosphate esters, mixtures of one or more cationic surfactants, and one or more non-ionic surfactants and alkyl phosphonate surfactants. The mixtures of one or more cationic and nonionic surfactants are described in U.S. Pat. No. 6,311,733, the relevant disclosure of which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effect is suitable for use in the present invention. The liquid carrier fluids that can be used in the liquid hardening agent component of the two-component consolidation fluids of the present invention preferably include those having high flash points (most preferably above about 125° F.). Examples of liquid carrier fluids suitable for use in the present invention include, but are not limited to, dipropylene glycol methyl ethers, dipropylene glycol dimethyl ethers, dimethyl formamides, diethyleneglycol methyl ethers, ethyleneglycol butyl ethers, diethyleneglycol butyl ethers, propylene carbonates, d'limonene and fatty acid methyl esters.

Another resin suitable for use in the methods of the present invention is a furan-based resin. Suitable furan-based resins include, but are not limited to, furfuryl alcohol resins, mixtures furfuryl alcohol resins and aldehydes, and a mixture of furan resins and phenolic resins. A furan-based resin may be combined with a solvent to control viscosity if desired. Suitable solvents for use in the furan-based consolidation fluids of the present invention include, but are not limited to 2-butoxy ethanol, butyl acetate, and furfuryl acetate.

Still another resin suitable for use in the methods of the present invention is a phenolic-based resin. Suitable phenolic-based resins include, but are not limited to, terpolymers of phenol, phenolic formaldehyde resins, and a mixture of phenolic and furan resins. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol.

Another resin suitable for use in the methods of the present invention is a HT epoxy-based resin. Suitable HT epoxy-based components include, but are not limited to, bisphenol A-epichlorohydrin resins, polyepoxide resins, novolac resins, polyester resins, glycidyl ethers and mixtures thereof. A HT epoxy-based resin may be combined with a solvent to control viscosity if desired. Suitable solvents for use with the HT epoxy-based resins of the present invention are those solvents capable of substantially dissolving the HT epoxy-resin chosen for use in the consolidation fluid. Such solvents include, but are not limited to, dimethyl sulfoxide and dimethyl formamide. A co-solvent such as a dipropylene glycol methyl ether, dipropylene glycol dimethyl ether, dimethyl formamide, diethylene glycol methyl ether, ethylene glycol butyl ether, diethylene glycol butyl ether, propylene carbonate, d'limonene and fatty acid methyl esters, may also be used in combination with the solvent.

Yet another resin consolidation material suitable for use in the methods of the present invention is a phenol/phenol formaldehyde/furfuryl alcohol resin comprising from about 5% to about 30% phenol, from about 40% to about 70% phenol formaldehyde, from about 10 to about 40% furfuryl alcohol, from about 0.1% to about 3% of a silane coupling agent, and from about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant. Suitable solvents for use in the phenol/phenol formaldehyde/furfuryl alcohol consolidation fluids of the present invention include, but are not limited to 2-butoxy ethanol, butyl acetate, and furfuryl acetate.

Some embodiments of the methods of the present invention provide a method of strengthening the near well bore area of a subterranean formation comprising the steps of isolating a zone of interest along a well bore, hydrajetting at least one slot in the zone of interest, introducing a consolidation material into the well bore and the slot, and allowing the consolidation material to substantially cure.

Some other embodiments of the methods of the present invention provide a method of strengthening the near well bore area of a subterranean formation comprising the steps of isolating a zone of interest along a well bore, acidizing a plurality of wormholes into the formation with an acid, introducing a consolidation material to the wormholes, and allowing the consolidation material to substantially cure.

Once the near well bore area has been treated to increase the distance the consolidating material can penetrate the subterranean formation and the consolidation material has been allowed to penetrate the near well bore subterranean formation and substantially cure, the well bore is essentially sealed from the formation by a layer of cured material. In some embodiments of the present invention, a stimulation treatment, such as fracturing, may then be performed to reconnect the well bore to produceable fluids in the formation.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of strengthening the near well bore region of a subterranean formation comprising the steps of:
   (a) isolating a zone of interest along a well bore;
   (b) hydrajetting a plurality of slots substantially uniformly around the circumference of the well bore in the zone of interest;
   (c) filling at least one of the slots with a consolidation material wherein the viscosity of the consolidation material is sufficient to enable the consolidation material to penetrate a distance into the formation; and
   (d) allowing the consolidation material to substantially cure.

2. The method of claim 1 wherein the consolidation material comprises a resin.

3. The method of claim 2 wherein the resin consolidation material comprises a hardenable resin component comprising a hardenable resin and a hardening agent component comprising a liquid hardening agent, a silane coupling agent, and a surfactant.

4. The method of claim 3 wherein the hardenable resin in the liquid hardenable resin component is an organic resin selected from the group consisting of bisphenol A-epichlorohydrin resin, polyepoxide resin, novolak resin, polyester resin, phenol-aldehyde resin, urea-aldehyde resin, furan resin, urethane resin, glycidyl ethers, and mixtures thereof.

5. The method of claim 3 wherein the liquid hardening agent in the liquid hardening agent component is selected from the group consisting of amines, aromatic amines, aliphatic amines, cyclo-aliphatic amines, piperidine, triethylamine, benzyldimethylamine, N,N-dimethylaminopyridine, 2-($N_2$N-dimethylaminomethyl)phenol, tris(dimethylaminomethyl)phenol, and mixtures thereof.

6. The method of claim 3 wherein the silane coupling agent in the liquid hardening agent component is selected from the group consisting of N-2-(aminoethyl)-3 -aminopropyltrimethoxysilane, 3-glycidoxypropyltrimethoxysilane, n-beta-(aminoethyl)-gamma-aminopropyl trimethoxysilane, and mixtures thereof.

7. The method of claim 3 wherein the surfactant in the liquid hardening agent component is selected from the group consisting of ethoxylated nonyl phenol phosphate ester, mixtures of one or more cationic surfactants, a $C_{12}$–$C_{22}$ alkyl phosphonate surfactant, one or more non-ionic surfactants and an alkyl phosphonate surfactant, and mixtures thereof.

8. The method of claim 3 wherein the resin consolidation material is a furan-based resin selected from the group consisting of furfuryl alcohol, a mixture furfuryl alcohol with an aldehyde, mixtures of furan resin and phenolic resin, and mixtures thereof.

9. The method of claim 3 wherein the resin consolidation material further comprises a solvent selected from the group consisting of 2-butoxy ethanol, butyl acetate, furfuryl acetate, and mixtures thereof.

10. The method of claim 2 wherein the resin consolidation material is a phenolic-based resin selected from the group consisting of terpolymer of phenol, phenolic formaldehyde resin, mixtures of phenolic and furan resin, and mixtures thereof.

11. The method of claim 10 wherein the resin consolidation material further comprises a solvent selected from the group consisting of butyl acetate, butyl lactate, furfuryl acetate, 2-butoxy ethanol, and mixtures thereof.

12. The method of claim 2 wherein the resin consolidation material is a high-temperature epoxy-based resin selected from the group consisting of bisphenol A-epichlorohydrin resin, polyepoxide resin, novolac resin, polyester resin, glycidyl ethers, and mixtures thereof.

13. The method of claim 12 wherein the resin consolidation material further comprises a solvent selected from the group consisting of dimethyl sulfoxide, dimethyl formamide, dipropylene glycol methyl ether, dipropylene glycol dimethyl ether, dimethyl formamide, diethylene glycol methyl ether, ethylene glycol butyl ether, diethylene glycol butyl ether, propylene carbonate, d-limonene, fatty acid methyl esters, and mixtures thereof.

14. The method of claim 1 further comprising, after step (d), the step of:
   (e) hydraulically fracturing the zone of interest.

* * * * *

UNITED STATES PATENT AND TRADEMARK OFFICE
CERTIFICATE OF CORRECTION

PATENT NO. : 7,017,665 B2
DATED : March 28, 2006
INVENTOR(S) : Philip D. Nguyen and Rick D. Gdanski It is certified that error appears in the above-identified patent and that said Letters Patent is hereby corrected as shown below:

Title page,
Item [75], should read
-- [75] Inventors: Philip D. Nguyen, Duncan, OK (US)
  Rick D. Gdanski, Duncan, OK (US) --.

Signed and Sealed this

Thirtieth Day of May, 2006

JON W. DUDAS
*Director of the United States Patent and Trademark Office*